United States Patent [19]

Rodely et al.

[11] 3,722,275

[45] Mar. 27, 1973

[54] BLUFF BODY FLOWMETER ARRANGEMENT FOR USE IN CONTROLLING AIR POLLUTION PRODUCED BY INTERNAL COMBUSTION ENGINES

[75] Inventors: Alan E. Rodely, Fanwood Township, Union County; Theodore J. Fussell, Bridgewater Township, Somerset County, both of N.J.

[73] Assignee: Eastech, Inc., South Plainfield, N.J.

[22] Filed: Nov. 4, 1971

[21] Appl. No.: 195,544

[52] U.S. Cl. .............................................73/194 B
[51] Int. Cl. ................................................G01f 1/00
[58] Field of Search..................73/118, 196, 205, 213

[56] References Cited

UNITED STATES PATENTS

| | | | |
|---|---|---|---|
| 3,116,639 | 1/1964 | Bird | 73/194 |
| 1,935,445 | 11/1933 | Heinz | 73/194 |
| 3,374,673 | 3/1968 | Trageser | 73/204 |
| 2,809,516 | 10/1957 | Brush | 73/196 X |
| 3,572,117 | 3/1971 | Rodely | 73/194 |
| 3,530,719 | 9/1970 | Aetfillisch | 73/205 |
| 3,456,500 | 7/1969 | Zaske | 73/118 |

*Primary Examiner*—Richard C. Queisser
*Assistant Examiner*—Herbert Goldstein
*Attorney*—Frederick W. Padden

[57] ABSTRACT

A bluff body flowmeter arrangement is described for use in controlling air pollution produced by internal combustion engines. The arrangement, which is used to monitor the air intake of the combustion engine, comprises, in combination, a conduit having an optional entrance portion of a relatively large uniform cross-section, an exit portion of a relatively smaller uniform cross-section coupled to the engine air intake and a transition portion having a tapered cross-section connecting the entrance and exit portions; a bluff body disposed in the exit portion transverse to the air flow; and damping means covering the inlet of the entrance portion for preventing drafts and cross-winds from disturbing the velocity profile of air flow in in the conduit sufficiently to interfere with regular vortex shedding by the bluff body. Also described is an embodiment in which the entrance portion of the conduit is omitted, in which case the damping means covers the inlet of the transition portion through which air enters and passes to a bluff body located in the exit portion.

13 Claims, 5 Drawing Figures

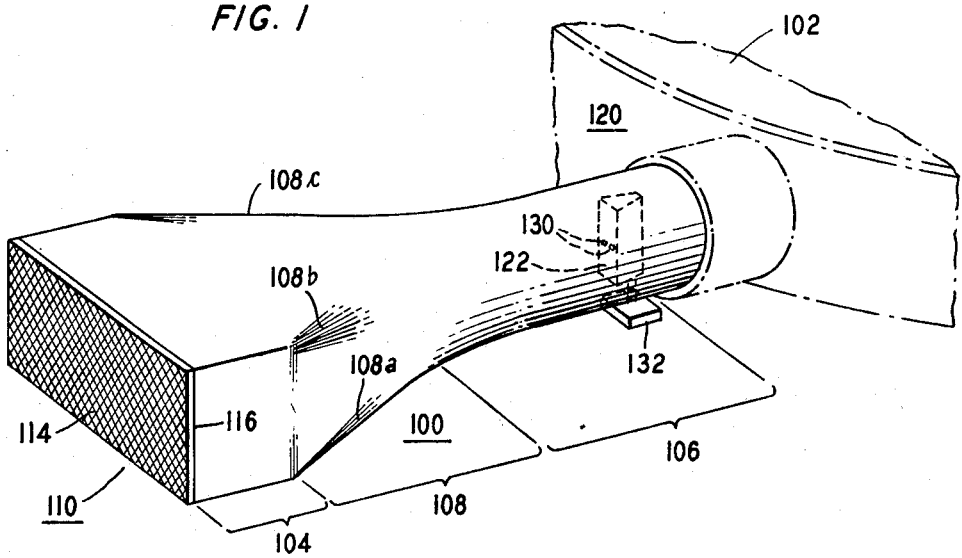
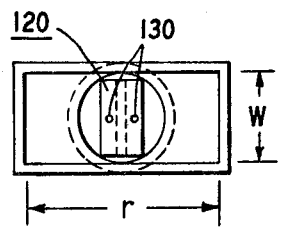
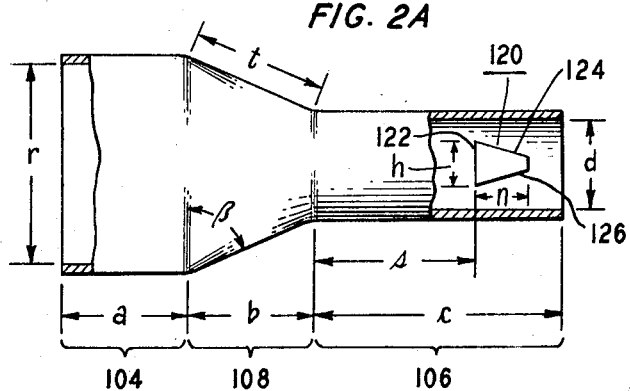
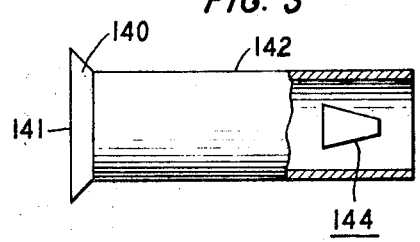
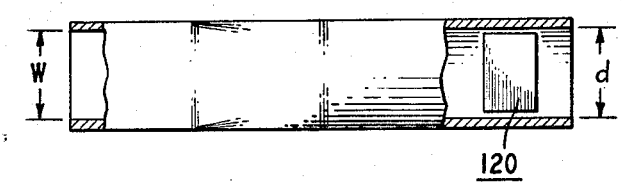
INVENTORS: ALAN E. RODELY
THEODORE J. FUSSELL, JR.
BY Frederick W. Padden
ATTORNEY

BLUFF BODY FLOWMETER ARRANGEMENT FOR USE IN CONTROLLING AIR POLLUTION PRODUCED BY INTERNAL COMBUSTION ENGINES

BACKGROUND OF THE INVENTION

This invention relates to flowmetering equipment and, more particularly to a bluff body flowmeter arrangement for use in monitoring the air intake of an internal combustion engine and for use in controlling the atmospheric pollution produced by such engines.

Recently Congress responded to the increasing deterioration of our environment by establishing the Environmental Protection Agency which has prescribed certain ecological standards aimed at reducing pollution of the atmosphere and waterways. Particular standards such as those published in the Federal Register Vol. 36, No. 128 (1971), were made applicable to air pollution produced by the internal combustion engine. In order to reduce such pollution it is desirable that combustion in the engine cylinders be complete which in turn requires that proper mixtures of air and gasoline be admitted to the cylinders. Consequently, there is now, more than ever, a need for monitoring the air intake of internal combustion engines, especially those employing fuel injection systems, in order to provide appropriate fuel flow.

These engines, however, present several unique problems which render difficult the monitoring of air intake. First, it is characteristic of a bluff body-vortex shedding flowmeter, and other types of flowmeters also, that for accurate and reliable performance, the velocity distribution of the air entering the flowmeter be reasonably uniform. However, where air flows from a large chamber, such as the area under an automobile hood, into a straight pipe inlet containing the flowmeter, the velocity distribution upstream of the meter is very irregular and non-uniform (i.e., asymmetric). In the prior art the flow from such a large chamber into the pipe would be made smooth and uniform by means of a horn-shaped inlet nozzle coupled to the flowmeter. This conventional approach, however, is disadvantageous for several reasons: the aerodynamic design of the horn-shape renders the nozzle expensive to manufacture; the nozzle is large and consequently would not fit under the hood without severely changing the profile of a typical automobile. Secondly, we have discovered that drafts and cross-winds, such as those produced by the fan or motion of an automobile, at the inlet to the flow-meter interfere significantly with the velocity distribution of air entering the flowmeter to the extent that vortex shedding is rendered intermittent.

It is, therefore, one object of our invention to monitor the air intake of internal combustion engines, blowers and the like.

It is another object of our invention to perform such monitoring in order to control the air pollution produced by such engines.

It is yet another object of our invention to measure the flowrate of air in a conduit in the presence of drafts or cross-winds at the inlet of the conduit.

Another object of our invention is to provide a compact flowmeter arrangement that can be readily installed under the hood of an automobile.

SUMMARY OF THE INVENTION

These and other objects are accomplished in accordance with an illustrative embodiment of our invention, a bluff body flowmeter arrangement comprising, in combination, a conduit having an optional entrance portion of a relatively large uniform cross-section, an exit portion of a relatively smaller uniform cross-section coupled to the engine air intake, and a transition portion having a tapered cross-section connecting the entrance and exit portions; a bluff body disposed in the exit portion transverse to the air flow; and damping means covering the inlet of the entrance portion for preventing drafts and cross-winds from disturbing the velocity profile of air flow in the conduit sufficiently to interfere with regular vortex shedding by the bluff body.

Illustratively, the entrance portion is a rectangular volume, the exit portion is a cylindrical volume and the transition portion is a substantially trapezoidal volume. We have found that this structure effectively produces air flow having a regular and uniform velocity distribution and further produces regular vortex shedding. In addition, we have found that damping means comprising a fiber glass member supported between a pair of mesh screens, when positioned over the inlet of the entrance portion, effectively renders the flowmeter insensitive to drafts or cross-winds.

Also described hereinafter is an embodiment in which the entrance portion of the conduit is omitted, in which case the damping means covers the inlet of the transition portion through which air enters and passes to a bluff body located in the exit portion.

BRIEF DESCRIPTION OF THE DRAWING

The above and other objects of our invention, together with its various features and advantages, can be easily understood from the following more detailed discussion, taken in conjunction with the accompanying drawings, in which:

FIG. 1 is a pictorial view of an illustrative embodiment of our invention connected to the air filter of an internal combustion engine;

FIGS. 2A, 2B and 2C are, respectively, top, end and sides views of our invention with the damping means removed, and FIG. 3 is a schematic side view of another embodiment of our invention.

DETAILED DESCRIPTION

Turning now to FIG. 1, there is shown a pictorial view of a bluff body flowmeter arrangement 100 for measuring the volumetric flowrate of air flowing into an air filter 102 (shown in phantom) of an internal combustion engine (not shown). The arrangement 100 comprises a conduit which has an entrance portion 104 having a relatively large uniform cross-sectional area, an exit portion 106 having a relatively smaller uniform cross-sectional area, and a transition portion having a tapered cross-section 108 connecting the entrance and exit portions. Covering the inlet of the entrance portion is damping means 110 illustratively comprising a fiber glass member (not shown) supported between a pair of mesh members (only one, member 114, is shown). The mesh members are mounted in a frame 116 which snaps over, or is otherwise affixed to, the inlet of the conduit.

In an illustrative embodiment, the entrance portion 104 is a uniformly rectangular volume, (i.e., being of uniformly rectangular cross-section both normal to and parallel to the direction of air flow) the transition portion 108 is a tapered rectangular volume (i.e., its cross-section is rectangular in a plane normal to the air flow (FIG. 2B) but is trapezoidal in a plane parallel to the air flow (FIG. 2A), and the exit portion 106 is a cylindrical volume. As shown in FIG. 1, the four edges of transition portion 108 (only three, edges 108a, 108b and 108c, are shown), which extend between the entrance exits portions, converge in the direction of air flow and are preferably concave in order to assist in maintaining a smooth flow transition to a bluff body 120 mounted in exit portion 106.

Typical dimensions of this embodiment are as follows: $r = 6$ inches, $w = d = 3$ inches, $a = 2$ inches, $b = 3$ inches, $c = 5$ inches, $s = 3.5$ inches, $t = 3.35$ inches, and $\beta = 63.5°$.

We have found that conduits constructed in accordance with the foregoing prescription produce a velocity distribution of air flow in exit portion 106 which is both regular and uniform. Moreover, the inclusion of damping means 110 prevents drafts and cross-winds from disturbing this velocity distribution, an important factor for accurate and reliable performance of vortex shedding flowmeters.

One such flowmeter, a bluff body 120, is shown mounted along a diameter $d$ of the cylindrical exit portion 106 and transverse to the air flow therein. This bluff body is of the type described by A.E. Rodely in U.S. Pat. No. 3,572,117 issued on Mar. 23, 1971 and assigned to the assignee hereof, and comprises, illustratively, a base surface 122 facing fluid (air) flow and a pair of converging surfaces 124 and 126 extending downstream from the base surface. While the body may take on various configurations, it is preferably a triangular (isoceles) right prism in which the base and converging surfaces are all planar. As described in the Rodely patent, the ratio of the axial length $n$ to the height $h$ of body 120 is preferably between 1 and 2, and the ratio of the height $h$ of body 120 to the inner diameter $d$ of cylindrical exit portion 106 is preferably between 0.15 and 0.4. Axial lengths and base heights within these limits prevent the flow streams passing above and below body 120 from intermingling and interacting until a favorable distance downstream of base surface 122 and thereby desirably generating strong oscillatory flow (vortex shedding) without intermittency. Moreover, we have found that for reliable flow measurement the distance $s$ separating the base surface 122 from the juncture between transition portion 108 and exit portion 106 should be greater than or equal to the diameter $d$ of the exit portion 108 in which the body 120 is mounted. As previously indicated, illustratively, $s = 3.5$ inches, $d = 3$ inches and the bluff body dimensions are $n = 1.5$ inches, and $h = 1$ inch.

Detection of vortex shedding is illustratively accomplished by means of a pair of sensors 130 (e.g., thermistors) mounted in base surface 122. Vortex-induced velocity changes at a frequency related to volumetric flowrate cool and thereby alter the resistance of sensors 130, producing an electrical signal which is coupled via leads (not shown) through body 120 to detection circuitry contained in housing 132. For differential sensor detection, such as that described by C.L. McMurtrie and A.E. Rodely in U.S. Pat. No. 3,587,312 issued on June 28, 1971 and assigned to the assignee hereof, this equipment typically includes a bridge circuit (which includes the sensors), a filter, a compensator, an amplifier and a trigger circuit.

Alternatively, detection may be accomplished by a central sensor arrangement described by T.J. Fussell, Jr. in copending application Ser. No. 111,829 (Case 1) filed on Feb. 2, 1971 and assigned to the assignee hereof, in which the bluff body has a first aperture extending between the converging surfaces and a second aperture extending transverse thereto from the exterior of the conduit. A sensor, mounted at the end of a rod, is inserted into the second aperture to the point of intersection of the two apertures. Vortex induced changes (pressure or velocity) in the first aperture are detected by the sensor and converted into an electrical signal indicative of flowrate.

Another form of detection is based on the vortex induced motion of a movable member disposed illustratively in a first aperture such as that described above. The member typically includes a ferro-magnetic disc which perturbs a magnetic field and thereby produces an electrical signal proportional to flow-rate. This approach to flowmetering is the subject matter of copending application Ser. No. 185,746 of T.J. Fussell, Jr. (Case 2) filed on Oct. 1, 1971 and assigned to the assignee hereof.

It is to be understood that the above-described arrangements are merely illustrative of the many possible specific embodiments which can be devised to represent application of the principles of our invention. Numerous and varied other arrangements can be devised in accordance with these principles by those skilled in the art without departing from the spirit and scope of our invention. In particular, in some applications a sufficiently uniform and smooth velocity distribution which gives acceptable vortex shedding is attained with the omission of the rectangular entrance portion 104 as shown in FIG. 3. In this case the transition portion 140 actually forms an entrance portion and is illustratively conical in shape. The exit portion 142 is a cylindrical pipe, as before, in which bluff body 144 is mounted along a diameter thereof. Damping means previously described, but not shown in FIG. 3, would be placed over inlet 141. Illustratively, for a 3 inch diameter exit portion, the conical portion would expand abruptly from 3 inches to about 6 inches in a 1 to 2 inch length.

Moreover, each of the foregoing embodiments could readily employ pressure sensors and a fluid sensing system as well as an electrical system. Furthermore, while the bluff body of FIG. 1 is shown located upstream of air filter 102 it could also be located downstream thereof, as desired.

What is claimed is:

1. Apparatus for measuring the flowrate of air into the intake of an engine comprising, in combination, a conduit having an inlet for receiving air flow from space exterior to said engine and an outlet connected to said intake, said conduit including a transition portion having a cross-section tapered in the direction of air flow and an exit portion having a uniform cross-section connected between said transition portion and said intake, said conduit being effective to produce a substantially uniform and regular flow velocity distribution in said exit portion, damping means covering said inlet for preventing drafts and cross-winds from disturbing the uniformity or regularity of said velocity distribution, said damping means being permeable to air flow substantially normal thereto, a bluff body mounted in said exit portion transverse to the flow of air therein for producing vortex shedding at a frequency indicative of volumetric flowrate, and detection means responsive to said vortex shedding for producing a signal indicative of volumetric flowrate of said air flow.

2. The apparatus of claim 1 wherein said bluff body is of axial length $n$ and comprises a planar base surface of height $h$ facing the air flow, a pair of converging planar surfaces extending downstream from said base surface and forming therewith a substantially triangular right prism.

3. The apparatus of claim 2 wherein said exit portion is a cylinder of diameter $d$ and the ratio of the axial length $n$ to the base height $h$ is between 1 and 2 and the ratio of the base height $h$ to the diameter $d$ is between 0.15 and 0.4, thereby to produce vortex shedding free of intermittency.

4. The apparatus of claim 3 wherein said transition portion is conical in shape.

5. The apparatus of claim 4 wherein said damping means comprises a pair of spaced mesh members extending across said inlet and a fiber glass member disposed between said mesh members.

6. The apparatus of claim 3 wherein said transition portion has a substantially rectangular cross-section normal to air flow which tapers in progressively smaller cross-sections in the direction of said flow and has a substantially trapezoidal cross-section parallel to said flow, thereby forming four edges at the outer extremes of said transition portion which converge in the direction of air flow.

7. The apparatus of claim 6 wherein said edges are convex.

8. The apparatus of claim 7 wherein said damping means comprises a pair of spaced mesh members extending across said inlet and a fiber glass member disposed between said mesh members.

9. The apparatus of claim 7 wherein said conduit includes an entrance portion having a uniform cross-section larger than that of said exit portion, said entrance portion being disposed between said inlet and said transition portion.

10. The apparatus of claim 9 wherein said entrance portion is of rectangular cross-section normal to air flow and parallel thereto, said damping means being affixed over one end of said entrance portion which forms said inlet.

11. The apparatus of claim 10 wherein said damping means comprises a pair of spaced mesh members extending across said inlet and a fiber glass member disposed between said mesh members.

12. The apparatus of claim 1 wherein said exit portion is a cylinder of diameter $d$ and said bluff body is positioned from the juncture of said transition and exit portions a distance $s$ greater than or equal to the diameter $d$.

13. Apparatus for measuring the volumetric flowrate of air into the intake of the air filter of an internal combustion engine comprising, in combination, a conduit having an inlet for receiving air flow from space exterior to said engine and an outlet connected to said intake, said conduit including a rectangular entrance portion being of uniform rectangular cross-section normal to and parallel to the direction of said air flow, a cylindrical exit portion of uniform circular cross-section normal to air flow and a smaller cross-sectional area than that of said entrance portion, said exit portion being connected to said intake, a transition portion connected between said entrance and exit portions and having a rectangular cross-section normal to air flow and having a substantially trapezoidal cross-section parallel to airflow, thereby forming four edges at the outer extremes thereof which converge in the direction of air flow, said edges being convex in shape, said conduit being effective to produce a substantially uniform and regular flow velocity distribution in said exit portion, damping means covering said inlet for preventing drafts and cross-winds from disturbing the uniformity or regularity of said velocity distribution, said damping means comprising a pair of spaced planar mesh members affixed across said inlet and a planar fiber glass member disposed between said mesh members, a bluff body of axial length $n$ mounted along a diameter $d$ of said exit portion and transverse to air flow therein for producing vortex shedding a frequency indicative of volumetric flowrate and free from intermittency, said body comprising a planar base surface of height $h$ and a pair of converging planar surfaces extending downstream from said base surface and forming therewith a substantially triangular right prism, the ratio of said axial length $n$ to said base height $h$ being between 1 and 2 and the ratio of said base height $h$ to said diameter $d$ being between 0.15 and 0.4, said body being positioned from the juncture of said exit portion and said transition portion a distance $s$ greater than or equal to said diameter $d$, and detection means responsive to said vortex shedding for producing a signal indicative of volumetric flowrate of said air flow.

* * * * *